United States Patent
Iguchi

(10) Patent No.: US 9,269,007 B2
(45) Date of Patent: Feb. 23, 2016

(54) IN-VEHICLE DISPLAY APPARATUS AND PROGRAM PRODUCT

(71) Applicant: DENSO CORPORATION, Kariya, Aichi-pref. (JP)

(72) Inventor: Sei Iguchi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 16 days.

(21) Appl. No.: 14/252,931

(22) Filed: Apr. 15, 2014

(65) Prior Publication Data

US 2014/0368540 A1    Dec. 18, 2014

(30) Foreign Application Priority Data

Jun. 14, 2013  (JP) ................................ 2013-125596

(51) Int. Cl.
| | |
|---|---|
| *G02B 27/01* | (2006.01) |
| *G02B 27/22* | (2006.01) |
| *G06K 9/00* | (2006.01) |
| *B60K 35/00* | (2006.01) |

(52) U.S. Cl.
CPC ............ *G06K 9/00832* (2013.01); *B60K 35/00* (2013.01); *G02B 27/01* (2013.01); *G02B 2027/014* (2013.01); *G02B 2027/0138* (2013.01)

(58) Field of Classification Search
None
See application file for complete search history.

(56) References Cited

U.S. PATENT DOCUMENTS

| | | | |
|---|---|---|---|
| 2003/0099390 A1* | 5/2003 | Zeng et al. ..................... 382/131 |
| 2005/0125121 A1 | 6/2005 | Isaji et al. | |
| 2006/0110062 A1* | 5/2006 | Chiang et al. ................. 382/260 |
| 2009/0005961 A1 | 1/2009 | Grabowski et al. | |
| 2009/0189753 A1 | 7/2009 | Enya et al. | |
| 2009/0226038 A1* | 9/2009 | Takei ............................ 382/103 |
| 2010/0091126 A1* | 4/2010 | Siddiqui et al. ............ 348/222.1 |
| 2011/0145257 A1* | 6/2011 | McDonald et al. ........... 707/743 |
| 2012/0213431 A1* | 8/2012 | Fujii ............................. 382/164 |
| 2013/0336524 A1* | 12/2013 | Zhang et al. .................. 382/103 |
| 2014/0313225 A1* | 10/2014 | Lee et al. ...................... 345/633 |

FOREIGN PATENT DOCUMENTS

| | | |
|---|---|---|
| JP | H6-255397 A | 9/1994 |
| JP | 2005-069799 A | 3/2005 |
| JP | 2006-162442 A | 6/2006 |
| JP | 2006-267249 A | 10/2006 |
| JP | 2010-234959 A | 10/2010 |
| JP | 2012-063524 A | 3/2012 |
| JP | 2013-203374 A | 10/2013 |

OTHER PUBLICATIONS

Office Action mailed Apr. 21, 2015 in the corresponding JP application No. 2013-125596 (and English translation).

* cited by examiner

*Primary Examiner* — Mark Zimmerman
*Assistant Examiner* — Jonathan M Cofino
(74) *Attorney, Agent, or Firm* — Posz Law Group, PLC; David Posz

(57) ABSTRACT

An in-vehicle display apparatus in a vehicle includes a region recognition circuit and an image output circuit. The region recognition circuit recognizes a target plane region in scenery ahead of the vehicle; the target plane region corresponds to a continuous region having (i) a flatness equal to or greater than a predetermined threshold value and (ii) an area size equal to or greater than a predetermined threshold value. The image output circuit displays a driving information picture as a virtual image using a liquid crystal panel such that a driver of the vehicle views the virtual image in the target plane region within a displayable region through a windshield of the vehicle.

4 Claims, 10 Drawing Sheets

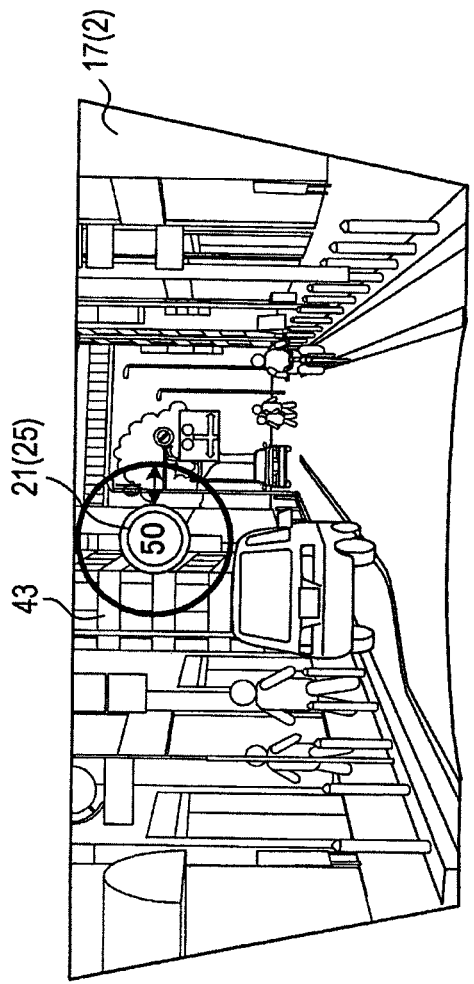
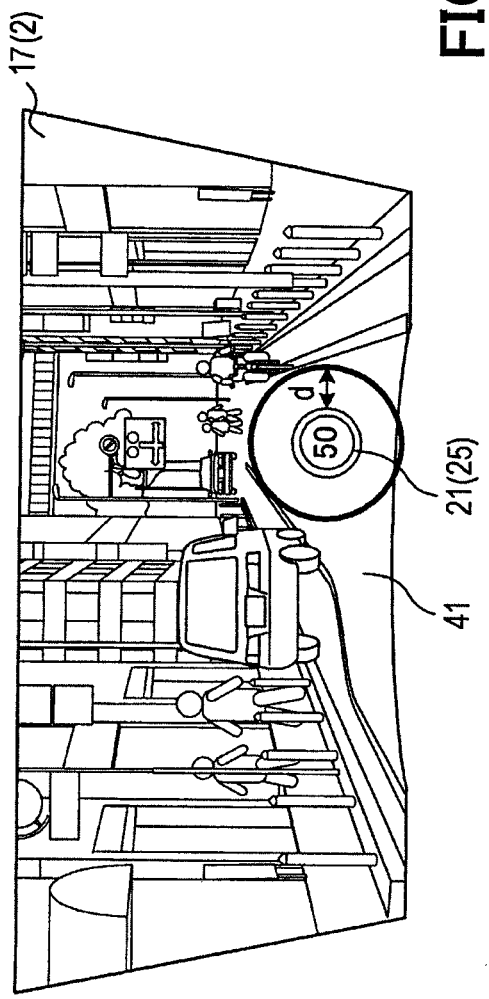

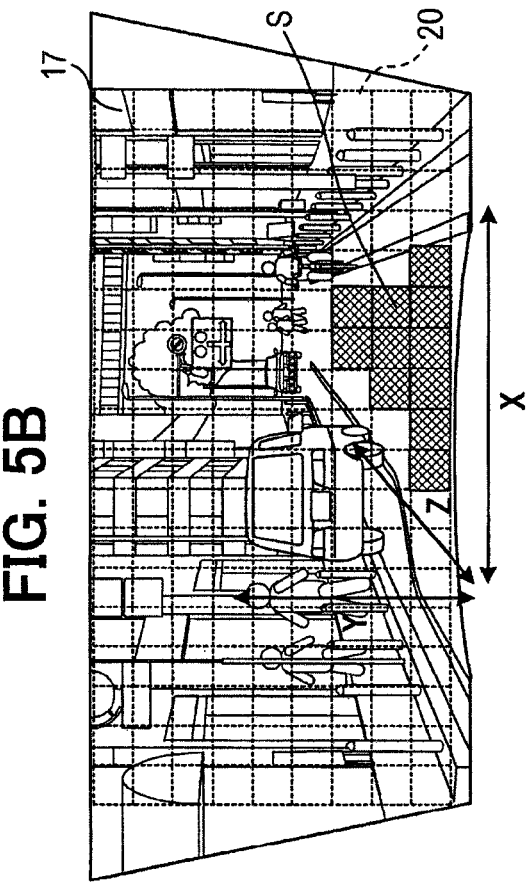
FIG. 5B
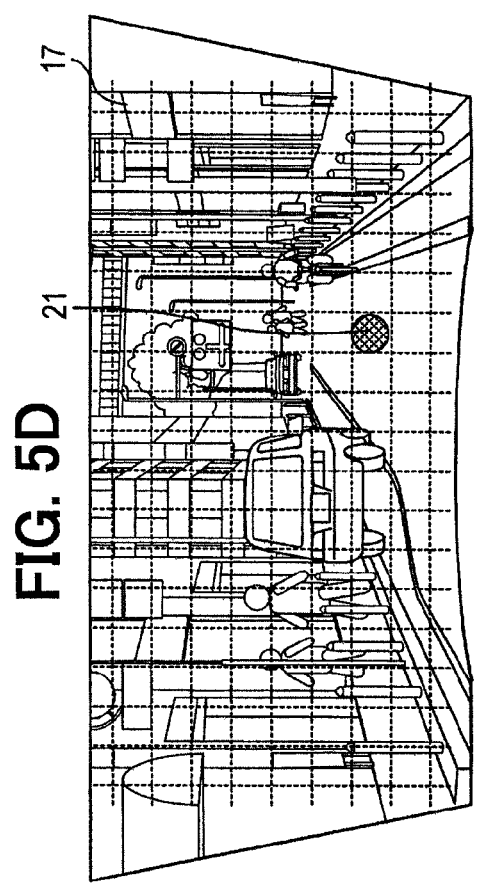
FIG. 5D
FIG. 5A
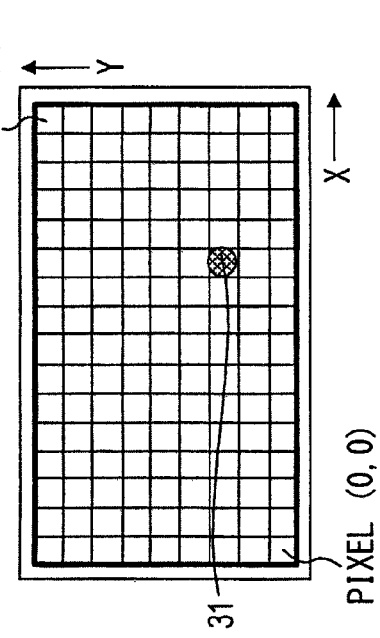
FIG. 5C

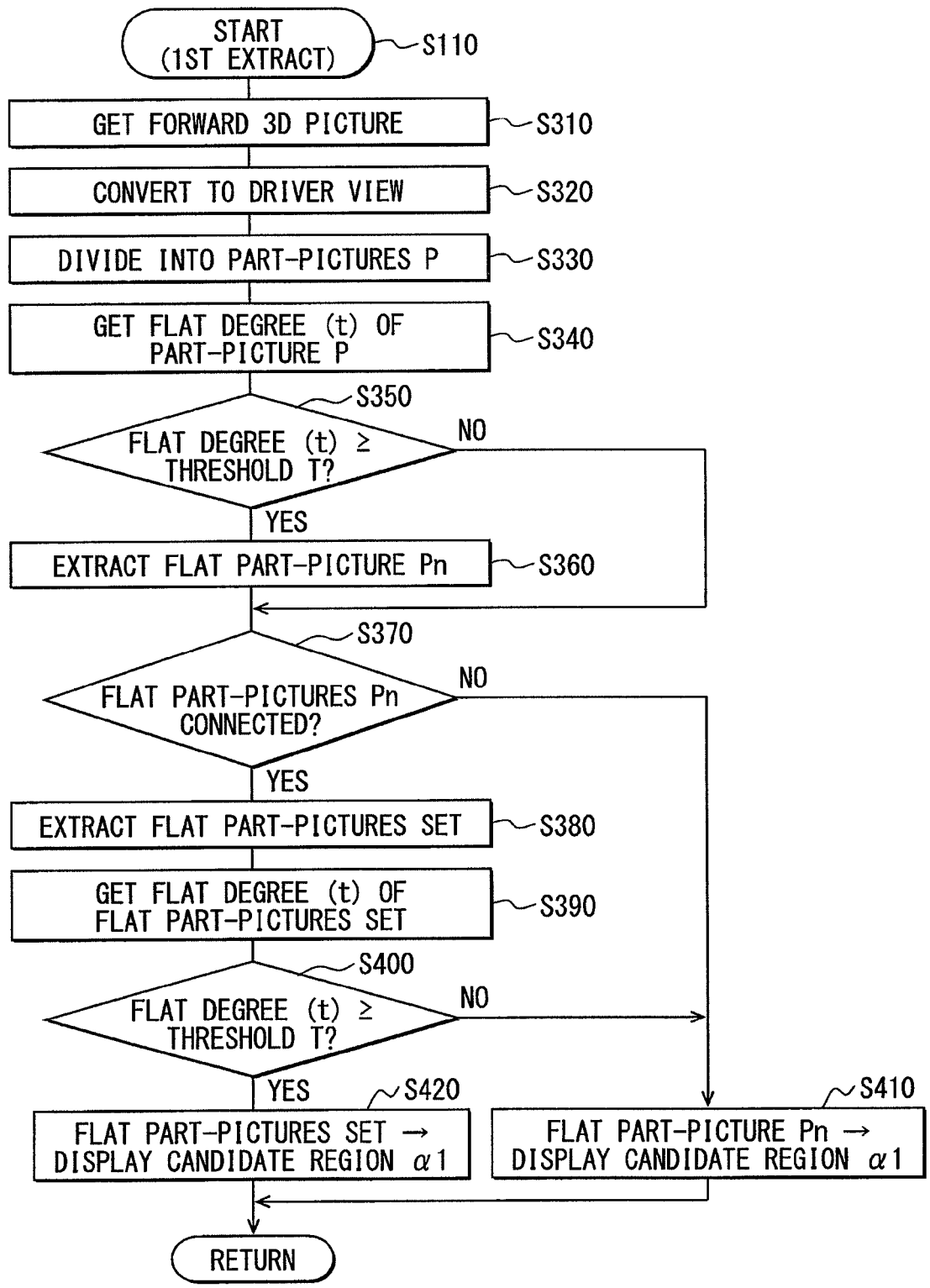

PART-PICTURE P

FLAT PART-PICTURE Pn

DISPLAY CANDIDATE REGION α1

DISPLAY CANDIDATE REGION α1 ⇒ TARGET PLANE REGION β1(βn)

MONO. PLANE REGION β2(βn), SECURED PLANE REGION β3(βn)

PART-PICTURE P

DISTANT PART-PICTURE Pn

DISPLAY CANDIDATE REGION $\gamma 1$ ⇒ TARGET SPACE REGION $\delta 1(\delta n)$

TARGET SPACE REGION $\delta 1(\delta n)$ ⇒ SECURED SPACE REGION $\delta 3(\delta n)$

IN-VEHICLE DISPLAY APPARATUS AND PROGRAM PRODUCT

CROSS REFERENCE TO RELATED APPLICATION

The present application is based on Japanese Patent Application No. 2013-125596 filed on Jun. 14, 2013, the disclosure of which is incorporated herein by reference.

TECHNICAL FIELD

The present disclosure relates to an in-vehicle display apparatus and a related program product, which achieve a HUD (Head-Up Display) to perform a virtual image display of a picture indicating information useful for a driver.

BACKGROUND ART

Patent Literature 1: JP 2012-063524 A
Patent Literature 2: JP-2008-501956 A (WO 2005421707 A2)

Patent Literature 1 describes a head-up display (HUD), which projects light on a windshield or combiner in a vehicle and displays a variety of pictures to permit a driver to view them through a windshield. Further, Patent Literature 2 uses a HUD, which displays a guidance picture at a position corresponding to a road ahead of the vehicle as a virtual image that indicates the heading direction (route guide information) indicated by a route guidance of a navigation system.

A conventional technology displays a guidance picture that appears in the scenery in a forward direction of a vehicle as extending from a sky into a road in the heading direction of the vehicle. For example, a displayed picture may overlap with a light portion of a traffic signal that is at a position over a road in the heading direction of the vehicle. Such a case may not permit the driver to promptly recognize the state of the traffic signal.

In addition, a conventional technology displays a guidance picture at a time corresponding to a route guidance of a navigation system. In some cases, a displayed picture may appear to be viewed in close proximity to road signs or road information boards as well as traffic signals in the vehicle forward direction. Such a case may decrease the visibility of the displayed picture or cause the information necessary for driving to be difficult for understanding.

SUMMARY

It is an object of the present disclosure to provide an in-vehicle display apparatus and its related program product, which permit an appropriate display of a virtual image of a picture indicating information useful for a driver of the vehicle.

According to a first example of the present disclosure, an in-vehicle display apparatus is provided to include a virtual image display device, a region recognition circuit, and an image output circuit. The virtual image display device permits a windshield or a combiner to reflect a predetermined light towards an eye of a driver of the vehicle to display a picture; the virtual image display device displays the picture in a displayable region as a virtual image appearing ahead of the vehicle.

The region recognition circuit recognizes a target plane region in scenery ahead of the vehicle; the target plane region is a continuous region having (i) a flatness equal to or greater than a predetermined threshold flatness and (ii) an area size equal to or greater than a predetermined threshold area size. The image output circuit causes the virtual image display device to display the virtual image in the displayable region such that a driver of the vehicle views the virtual image in the target plane region recognized by the region recognition circuit.

Under such a configuration, the drive can see a displayed picture as a virtual image in a relatively wide or large region (i.e., target plane region) having a high flatness within a forward scenery ahead of the vehicle. This can prevent the displayed picture from being overlapped with a region or an uneven region (i.e., stereoscopic region) having a low flatness such as another vehicle, pedestrian, or traffic signal including a light portion.

In addition, the threshold area size defining a target plane region may be designated to be much larger, so as to prevent the displayed picture from appearing in close proximity to the uneven region. Therefore, the in-vehicle display apparatus can reduce a possibility that causes a driver not to promptly recognize the state of a traffic signal or a possibility that decreases the visibility of the displayed picture. The driver of the vehicle can be provided with a proper virtual image display that displays a picture useful for driving.

According to a second example of the present disclosure, an in-vehicle display apparatus is provided to include a virtual image display device, a region recognition circuit, and an image output circuit. The virtual image display device permits a windshield or a combiner to reflect a predetermined light towards an eye of a driver of the vehicle to display a picture; the virtual image display device displays the picture in a displayable region as a virtual image appearing ahead of the vehicle. The region recognition circuit recognizes a target space region in scenery ahead of the vehicle; the target space region is a continuous region having (i) a distance equal to or greater than a predetermined threshold distance from the vehicle and (ii) an area size equal to or greater than a predetermined threshold area size. The image output circuit causes the virtual image display device to display the virtual image in the displayable region such that a driver of the vehicle views the virtual image in the target space region recognized by the region recognition circuit.

Under such a configuration, the driver can see a displayed picture as a virtual image in a relatively wide or large region (i.e., target space region) having a long distance from the vehicle within a forward scenery ahead of the vehicle. This can prevent the displayed picture from being superimposed on an object existing in close proximity to the vehicle; the object may include a road sign, a road information board, a different vehicle, a pedestrian, or an obstacle.

Therefore, the in-vehicle display apparatus can certainly reduce a possibility that prevents a driver from promptly recognizing the information, which is necessary for driving and near the vehicle. The driver of the vehicle can be provided with a proper virtual image display that displays a picture useful for driving.

According to a third example of the present disclosure, an in-vehicle display apparatus is provided to include a virtual image display device, an image output circuit, and a region recognition circuit. The virtual image display device permits a windshield or a combiner to reflect a predetermined light towards an eye of a driver of the vehicle to display a picture; the virtual image display device displays the picture in a displayable region as a virtual image appearing ahead of the vehicle. The image output circuit causes the virtual image display device to display the virtual image in the displayable region such that a driver of the vehicle views the virtual image in a predetermined target region. The region recognition circuit recognizes a monotonous region, which is a continuous region having an identical color tone, within the target region. The image output circuit causes the virtual image display device to switch the virtual image into a non-displayed state when a ratio of the monotonous region to the target region is equal to or less than a predetermined threshold ratio.

In such a configuration, when the driver sees a traffic signal, a road sign, a road information board, etc. entering a predetermined region (i.e., target region) that displays a virtual image, the ratio of a sky scenery (monotonous region) to the target region decreases. This permits the virtual image to evacuate the target region.

Therefore, under such a configuration, the superimposition display or close proximity display of a displayed picture can be prevented under the state where a traffic signal, a road sign, a road information board, etc. exists in a vehicle forward direction. The driver of the vehicle can be provided with a proper virtual image display that displays a picture useful for driving.

According to a fourth example of the present disclosure, an in-vehicle display apparatus is provided to include a virtual image display device, an image output circuit, and a region recognition circuit. The virtual image display device permits a windshield or a combiner to reflect a predetermined light towards an eye of a driver of the vehicle to display a picture; the virtual image display device displays the picture in a displayable region as a virtual image appearing ahead of the vehicle. The image output circuit causes the virtual image display device to display the virtual image in the displayable region such that a driver of the vehicle views the virtual image in a predetermined target region. The region recognition circuit recognizes a necessary information region, which provides information needed to drive the vehicle, within the target region. The image output circuit causes the virtual image display device to switch the virtual image into a non-displayed state when a ratio of the necessary information region to the target region is greater than a predetermined threshold ratio.

Under such a configuration, even when a target region contains several color tones from the viewpoint of a driver, a displayed picture is permitted to be superimposed on a secured region that precludes a necessary information region. This can increase an opportunity of displaying pictures safely and efficiently.

According to another example of the present disclosure, a program product stored in a non-transitory computer-readable medium is provided as follows. The product includes instructions permitting a computer to function as the image output circuit according to one example among the first to fourth examples of the in-vehicle display apparatuses, the computer being connected with the virtual image display device and the region recognition circuit according to the one example.

According to yet another example of the present disclosure, a program product stored in a non-transitory computer-readable medium is provided as follows. The product includes instructions permitting a computer to function as the region recognition circuit and the image output circuit according to one example among the first to fourth examples of the in-vehicle display apparatuses, the computer being connected with the virtual image display device according to the one example.

When being installed into a computer, the above examples of the program products can provide an advantageous effect similar to those of the above examples of the in-vehicle display apparatuses.

BRIEF DESCRIPTION OF THE DRAWINGS

The above and other objects, features, and advantages of the present disclosure will become more apparent from the following detailed description made with reference to the accompanying drawings. In the drawings:

FIGS. 3A and 3B are diagrams illustrating virtual images appearing ahead of a vehicle from a viewpoint of a driver;

FIG. 5A is a diagram indicating display coordinates of a liquid crystal panel;

FIG. 5B is a diagram illustrating a target region;

FIG. 5C is a diagram illustrating a conversion relation between display coordinates of a liquid crystal panel and a position of a target region;

FIG. 5D is a diagram illustrating a position of a virtual image;

FIG. 7 is a flowchart diagram illustrating a first display candidate region extraction process;

DETAILED DESCRIPTION

Hereinafter, description will be given to an in-vehicle display apparatus 1 according to an embodiment of the present disclosure with reference to drawings.

<Overall Configuration>

Figure 1:
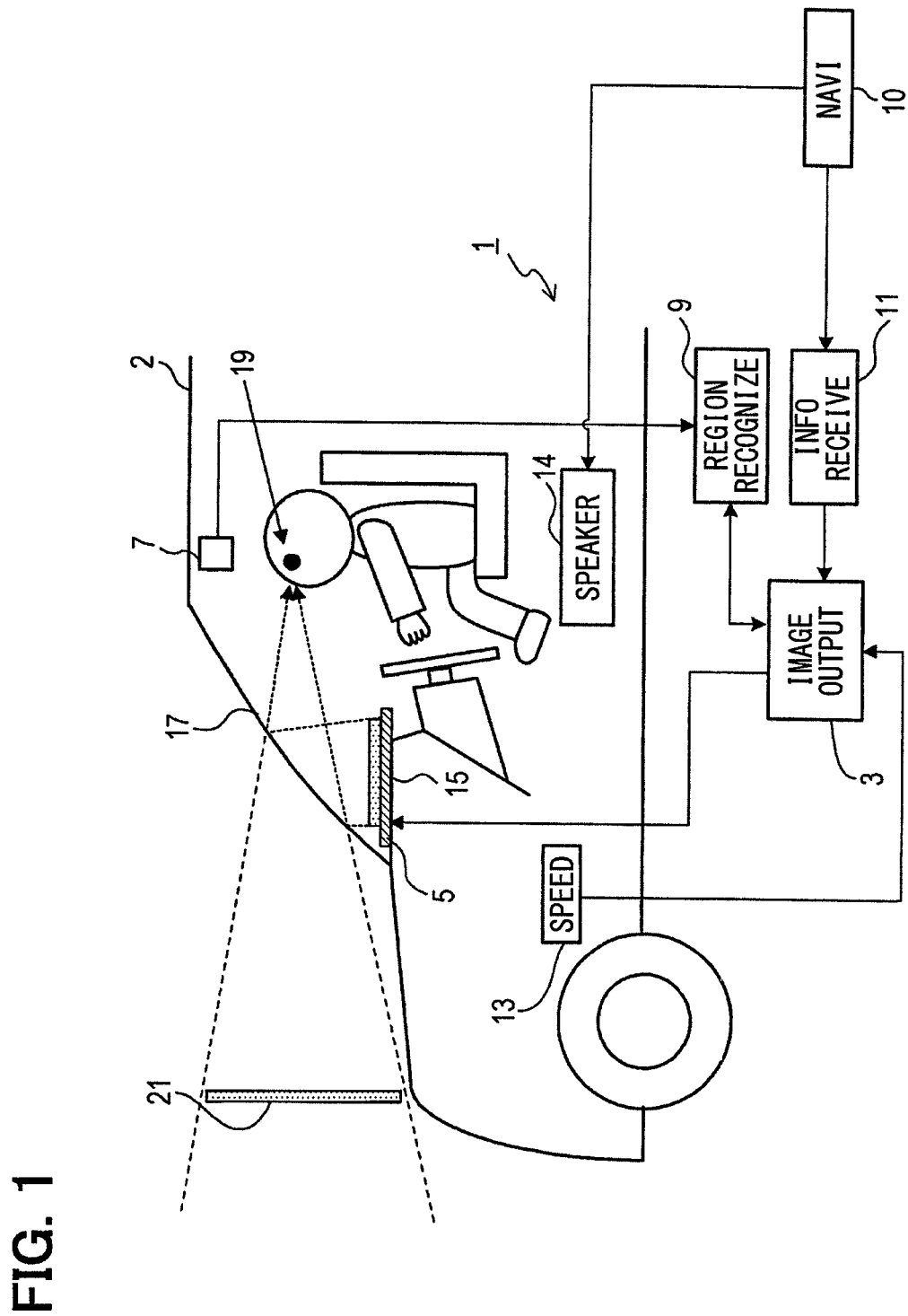
FIG. 1 is a diagram illustrating an overall configuration of an in-vehicle display apparatus according to an embodiment of the present disclosure.

With reference to FIG. 1, the in-vehicle display apparatus 1 mounted in a vehicle 2 (i.e., a host vehicle) of a user includes an image output circuit (image control device or means) 3, a liquid crystal panel (virtual image display device or means) 5, a camera 7, a region recognition circuit (region recognition device or means) 9, a navigation system 10, an information reception circuit (information acquisition device or means) 11, a speed sensor 13, and a speaker 14.

The image output circuit 3 outputs picture data to a liquid crystal panel 5. The liquid crystal panel 5 is arranged on an instrumental panel 15, and displays a picture (i.e., an image) based on the picture data from the image output circuit 3; the liquid crystal panel 5 outputs light based on the displayed picture. The light outputted by the liquid crystal panel 5 is reflected by a windshield 17 of the vehicle 2 to thereby enter a viewpoint 19 of a driver of the vehicle 2. As a result, from the viewpoint 19, the driver views a virtual image 21 of the picture displayed on the liquid crystal panel 5; the virtual image 21 appears at a position in a predetermined distance through the windshield 17 in a forward direction of the vehicle 2 (i.e., ahead of the vehicle 2).

Figure 2:
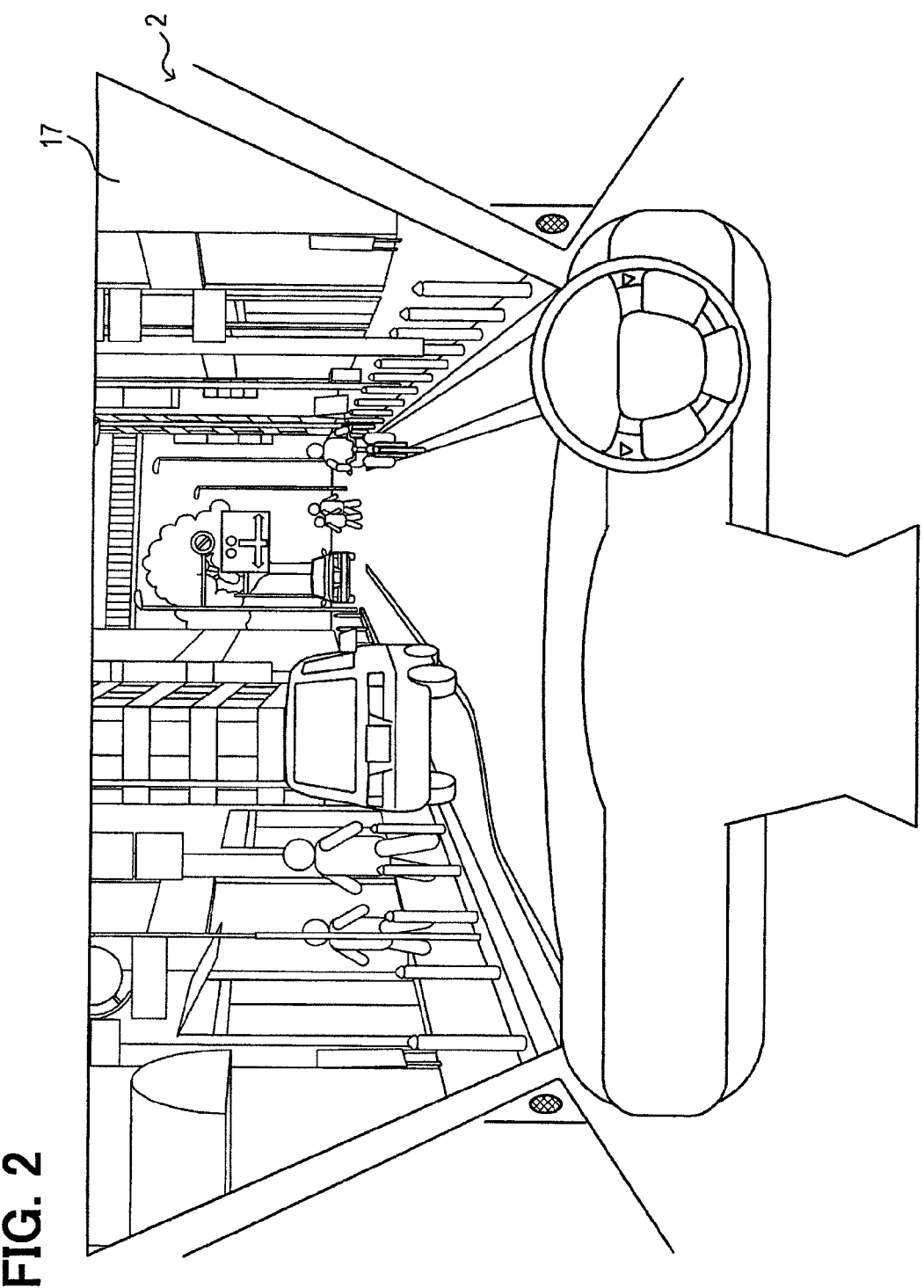
FIG. 2 is a view example of scenery, which is ahead of a vehicle and viewed by a driver through a windshield.

For instance, when the vehicle 2 travels in an urban road as illustrated in FIG. 2, the image output circuit 3 and the liquid crystal panel 5 perform a virtual image display of driving information in a target plane region or a target space region as below. The driving information is provided as a driving information picture 25 useful or necessary for the driver such as a speed limit in FIGS. 3A and 3B; the driving information picture 25 appears as a virtual image 21 through the windshield 17 from the driver viewpoint 19. That is, the target plane region appears as a continuous high flatness region having a relatively large area (i.e., area size) in scenery ahead of the vehicle 2 from the viewpoint 19 of the driver; the continuous high flatness region is indicated as a road surface 41 in FIG. 3A, for instance. Further, the target space region appears as a continuous long distance region, which is distant from the vehicle 2 and has a relatively large area (i.e., area size), in scenery ahead of the vehicle 2 from the viewpoint 19 of the driver; the continuous long distance region is indicated as a cluster of buildings 43 in FIG. 3B, for instance.

Further, a driving information object is defined as information needed to drive the vehicle 2 such as an on-road sign; an on-road partition line such as a traffic lane mark; a road sign; a road information board; a traffic signal; or another vehicle (including automobile, motorcycle, or bicycle), an obstacle, or a pedestrian comparatively near the vehicle 2. The above target plane region or target space region is previously designated so as to enable the driving information picture 25 to be displayed or appearing with a marginal distance d separated from any driving information object.

In addition, the image output circuit 3 and the liquid crystal panel 5 can change the virtual image 21 in respect of a magnitude (i.e., size of the image) or a color tone in various manners. Further, the virtual image 21 appears in a displayable region 20 within scenery through the windshield 17; the displayable region 20 is provided to be smaller than the scenery through the windshield 17 but provided to range from an upper portion to an lower portion of the windshield 17. The virtual image 21 appears by being transmitted through the windshield 17, to which a combiner may be attached.

The camera 7 is an imaging apparatus that photographs or captures a forward image or a forward scenery image that is an image of scenery in front of or ahead of the vehicle 2. The camera 7 is a stereo camera that can produce a 3D (three-dimensional) picture or image also providing a sense of depth by capturing a picture or image of the forward scenery simultaneously from different directions to obtain information of the depth or perspective. The camera 7 is disposed at a position near the driver viewpoint 19 in a vehicle compartment of the vehicle 2. The region recognition circuit 9 determines whether the forward scenery picture captured by the camera 7 contains a candidate of target plane region or a candidate of target space region, and, if contained, narrows down the candidate based on color tone or existence of objects to calculate three-dimensional coordinate informational data which indicates positions of the candidate narrowed down as a target plane region or target space region. This image recognition process can use any one of well-known image recognition processes or techniques.

The navigation system 10 uses a well-known GPS (Global Positioning System) to acquire positional information of the vehicle 2 and outputs road environment information containing the positional information as well as road information such as a speed limit of a road the vehicle 2 travels based on map data. In addition, the navigation system 10 wirelessly communicates with an external service center or roadside apparatus via a wireless communicator (unshown) to acquire road information such as congestion information or traffic lane regulation of a road the vehicle 2 travels, and outputs the acquired information as road environment information. In addition, the navigation system 10 designates a guidance route to a destination and performs a route guidance when the destination of the vehicle 2 is inputted. The information reception circuit 11 receives the positional information, road environment information, route guidance information, or the like using the navigation system 10, and outputs the received information to the image output circuit 3.

The speed sensor 13 detects a vehicle speed of the vehicle 2, and outputs the detected result to the image output circuit 3. The speaker 14 is disposed in a vehicle compartment of the vehicle 2, and outputs a sound message depending on route guidance in the navigation system 10.

<Processes Performed by In-Vehicle Display Apparatus>

The following explains a process performed by the in-vehicle display apparatus 1 with reference to drawings. In the present embodiment, for instance, the image output circuit 3, the region recognition circuit 9, and the information reception circuit 11 may be provided as being included in one or more than one computer which is a conventional one containing a CPU, RAM, ROM, or the like. The following display control process may be achieved based on programs stored in the ROM, using the RAM as a work area. It is further noted that a flowchart or processing of the process in the present application includes sections (also referred to as steps), which are represented, for instance, as S110. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

Figure 4:
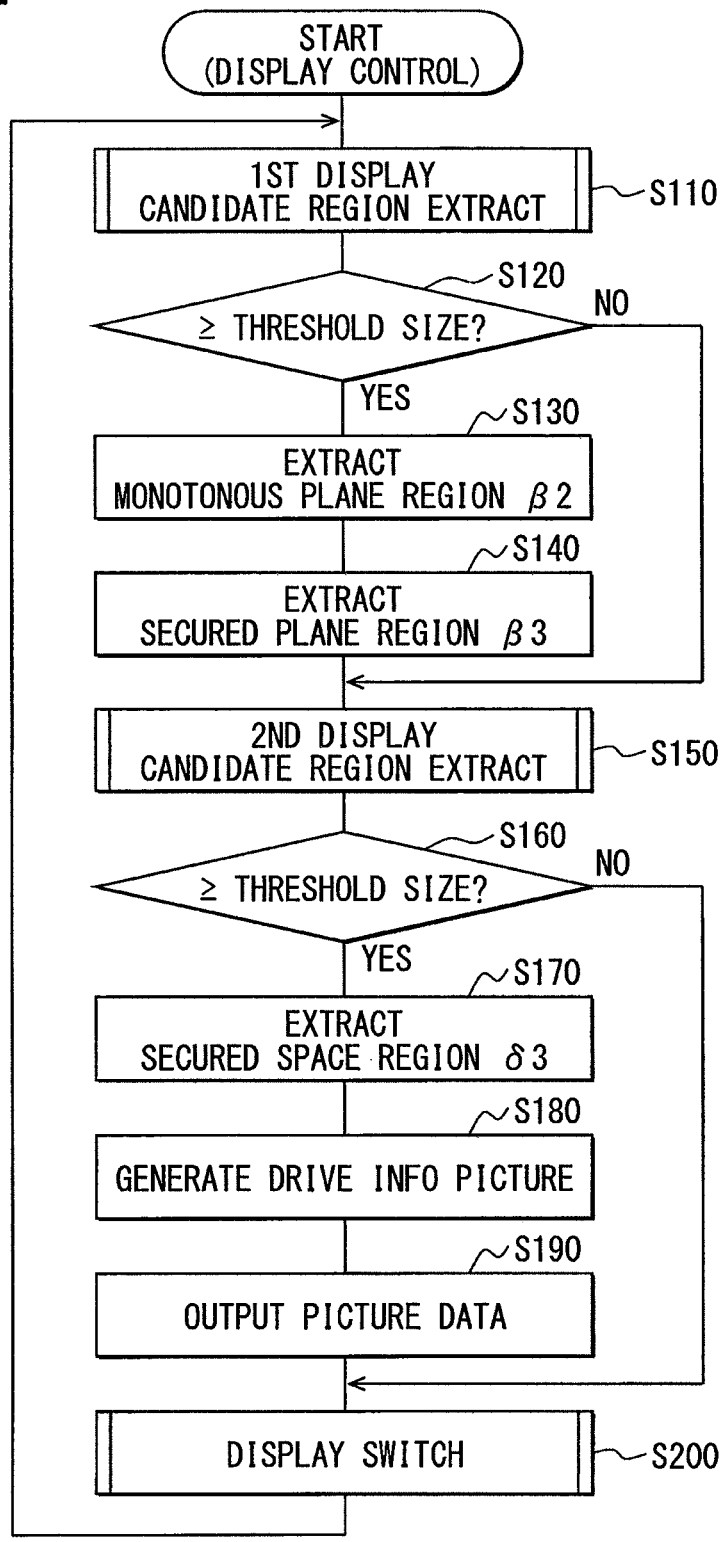
FIG. 4 is a flowchart diagram illustrating a display control process.

With reference to FIG. 4, the display control process is started, for example, with the engine ON of the vehicle 2. At S110, the region recognition circuit 9 starts to perform a first display candidate region extraction process to extract a display candidate region α1 (see FIG. 8B), which is a continuous high flatness region such as a sky, a road, or a wall in a forward scenery picture captured by the camera 7. This processing will be explained in detail later.

At S120, the region recognition circuit 9 determines whether one or more than one display candidate region α1 extracted at S110 includes a region having an area (i.e., area size) equal to or greater than a predetermined threshold area size based on the above-mentioned marginal distance d (i.e., display margin). When a region having an area size equal to or greater than the predetermined threshold area size is included (S120: Yes), the region is defined or extracted as a target plane region β1. The processing then proceeds to S130. When any region having an area size equal to or greater than the predetermined threshold area size is not included (S120: No), the processing proceeds to S150. Further, when more than one region having an area size equal to or greater than the predetermined threshold area size is included, the region having the largest area size among more than one region is defined as the target plane region β1, for example.

At S130, the region recognition circuit 9 extracts a monotonous plane region β2 in the target plane region β1 extracted at S120. It is noted that the target plane region β1 is included in a 3D target picture that is divided into a plurality of part-pictures P (refer to FIG. 8A); the target plane region β1 is divided into a plurality of candidate (flat) part-pictures Pn (also refer to FIGS. 8A, 8B, 8C). The part-picture P may be also referred to as a partial picture P or a segmental picture P. Thus, a 3D target picture may be divided into a plurality of segmental pictures P. This will be explained later in more detail. The monotonous plane region β2 is extracted as a region providing or appearing as a continuous identical color tone, based on attributes such as color or brightness of the candidate (flat) part-pictures Pn included in the target plane region β1 (see FIG. 8C). For example, suppose a case where a road surface is extracted as a target plane region β1 at S120. The road surface includes an on-road sign or an on-road partition line. In such a case, the monotonous plane region β2 is extracted by excluding a region including the on-road sign and the on-road partition line from the target plane region β1. Such detection of the on-road sign and/or the on-road partition line may be achieved by any one of well-known line detection technologies, which stores previously on-road image information such as a shape or color of line or the like on a road surface and determines an on-road line when a captured forward scenery picture contains an element equivalent or similar to the stored information.

At S140, the region recognition circuit 9 extracts a secured plane region β3 (see FIG. 8C) from the target plane region β1 extracted at S120 or from the monotonous plane region β2 by excluding a necessary information region that highly possibly indicates a driving information object or driving information needed to drive vehicles. For example, suppose a case where a sky is extracted as a target plane region β1 at S120 and the driver or driver viewpoint 19 views a part of the sky appearing as containing a driving information object such as a lamp portion of a traffic signal, a road sign, and/or a road information board. In such a case, the part of the sky containing the driving information object is defined as a necessary information region; this necessary information region is excluded from the target plane region β1 so that a secured plane region β3 is acquired. Such detection of a specific object such as a vehicle, pedestrian, traffic signal, road sign, or road information board may be achieved using any one of well-known pattern matching technologies, which previously stores a shape, color, or the like of each specific object and determines the specific object when a captured forward scenery picture contains an element equivalent or similar to the stored one. It is noted that one or both of S130 and S140 may be omitted from the process. Now, for explaining below, a subset plane region βn may be defined as the target plane region β1, the monotonous plane region β2, or the secured plane region β3 extracted at S120, S130, or S140, respectively.

At S150, the region recognition circuit 9 starts to perform a second display candidate region extraction process to extract a display candidate region γ1 (see FIG. 10B), which appears as a continuous long distance region far from the vehicle 2 such as a sky, or a distant artificial or natural object in a forward scenery picture captured by the camera 7. This processing will be explained in detail later.

At S160, the region recognition circuit 9 determines whether one or more than one display candidate region γ1 extracted at S150 includes a region having an area (i.e., area size) equal to or greater than a predetermined threshold area size based on the above-mentioned marginal distance d (i.e., display margin). When a region having an area equal to or greater than the predetermined threshold area size is included (S160: Yes), the region is defined or extracted as a target space region δ1 (see FIG. 10B). The processing then proceeds to S170. When any region having an area equal to or greater than the predetermined threshold area size is not included (S160: No), the processing proceeds to S200. When more than one region having an area size equal to or greater than the predetermined threshold area size is included, the region having the largest area among more than one region having an area size equal to or greater than the predetermined threshold area size is defined as the target space region δ1, for example.

At S170, the region recognition circuit 9 extracts a secured space region δ3 (see FIG. 10C) from the target space region δ1 extracted at S160 by excluding a necessary information region that highly possibly indicates a driving information object or driving information needed to drive vehicles. This extraction is realized by a technology or processing similar to that at S140. It is noted that S170 may be omitted from the process. Now, for explaining below, a subset space region δn may be defined as the target space region δ1 or the secured space region δ3 extracted at S160 or S170, respectively. Further, either S110 to S140 or S150 to S170 may be omitted from the process. Now, for explaining below, a target region S may be defined as the subset plane region βn or the subset space region on extracted at S110 to S140 or S150 to S170, respectively.

At S180, the image output circuit 3 generates a driving information picture 25 that indicates at least one of a variety of information; the variety of information includes road environment information or route guidance information received from the information reception circuit 11 and/or vehicle state information such as a vehicle speed received from the speed sensor 13. Further, a pattern, size, color, brightness, or the like of each driving information picture 25 may be predetermined or determined depending on a shape, size, color, brightness, or the like of a target region S. In addition, suppose a case where a plurality of information items to be displayed (or driving information pictures) are present. In such a case, according to priorities designated previously, only a picture or item having a higher priority may be generated as a driving information picture 25. Alternatively, all the pictures or items may be generated as respective driving information pictures 25.

At S190, the image output circuit 3 determines, within the target region S, a position (coordinates) at which the driving information picture 25 generated at S180 is displayed; generates a picture data for displaying the driving information picture 25 at the determined coordinates; and outputs the generated picture data to the liquid crystal panel 5. The virtual image 21 of the driving information picture 25 is thereby displayed within a forward scenery ahead of the vehicle 2 based on the picture data such that the driver or the driver viewpoint 19 views the virtual image 21 in a region appearing as a continuous high flatness region with a relatively large area size or in a region appearing as a continuous long distance region far from the vehicle 2 with a relatively large area size, to be separated from an object with a distance longer than a predetermined distance d, as illustrated in FIG. 3A or FIG. 3B. Further, the display position of the driving information picture 25 may be a position in a central portion in the target region S or a position previously assigned with a high priority in the target region S. In addition, displaying the driving information picture 25 in the target region S may be performed after a predetermined time period elapses since the previous display timing, in order to prevent the driving information picture 25 from moving immediately in the target region S.

At S200, the image output circuit 3 performs a display switching process, which determines either to continue displaying the driving information picture 25, or to switch the driving information picture 25 from a displayed state into a non-displayed state. Then, the processing returns to S110.

As explained above, in the display control process, the region recognition circuit 9 generates three-dimensional coordinate informational data which indicates a position of the target region S. The three-dimensional coordinate informational data indicated by a combination of a coordinate in X direction (vehicle width direction), a coordinate in Y direction (vehicle height direction), a coordinate in Z direction (depth direction or vehicle heading direction), as indicated in FIG. 5B. The in-vehicle display apparatus 1 stores, in a storage portion (unshown) such as ROM, a conversion relation or a coordinate conversion table between the display coordinates in the liquid crystal panel 5 and the three-dimensional coordinate informational data of the target region S generated by the region recognition circuit 9, as illustrated in FIG. 5C. Suppose a case that that the liquid crystal panel 5 indicates a display 31 on the coordinates obtained using the coordinate conversion table, as indicated in FIG. 5A. In such a case, the driver or driver viewpoint 19 views a virtual image 21 that is produced by the display 31 at a position in the target region S as indicated in FIG. 5B and FIG. 5D.

Thus, the image output circuit 3 is enabled to calculate display coordinates corresponding to a target region S using (i) the three-dimensional coordinate informational data generated by the region recognition circuit 9 and (ii) the coordinate conversion table. Further, in the display control process, the image output circuit 3 is enabled to perform a virtual image display to permit a driver or driver viewpoint 19 to view the virtual image 21 of the driving information picture 25 in the target region S generated by the region recognition circuit 9 within a displayable region 20 provided by the liquid crystal panel 5.

<Display Switching Control Process>

Figure 6:
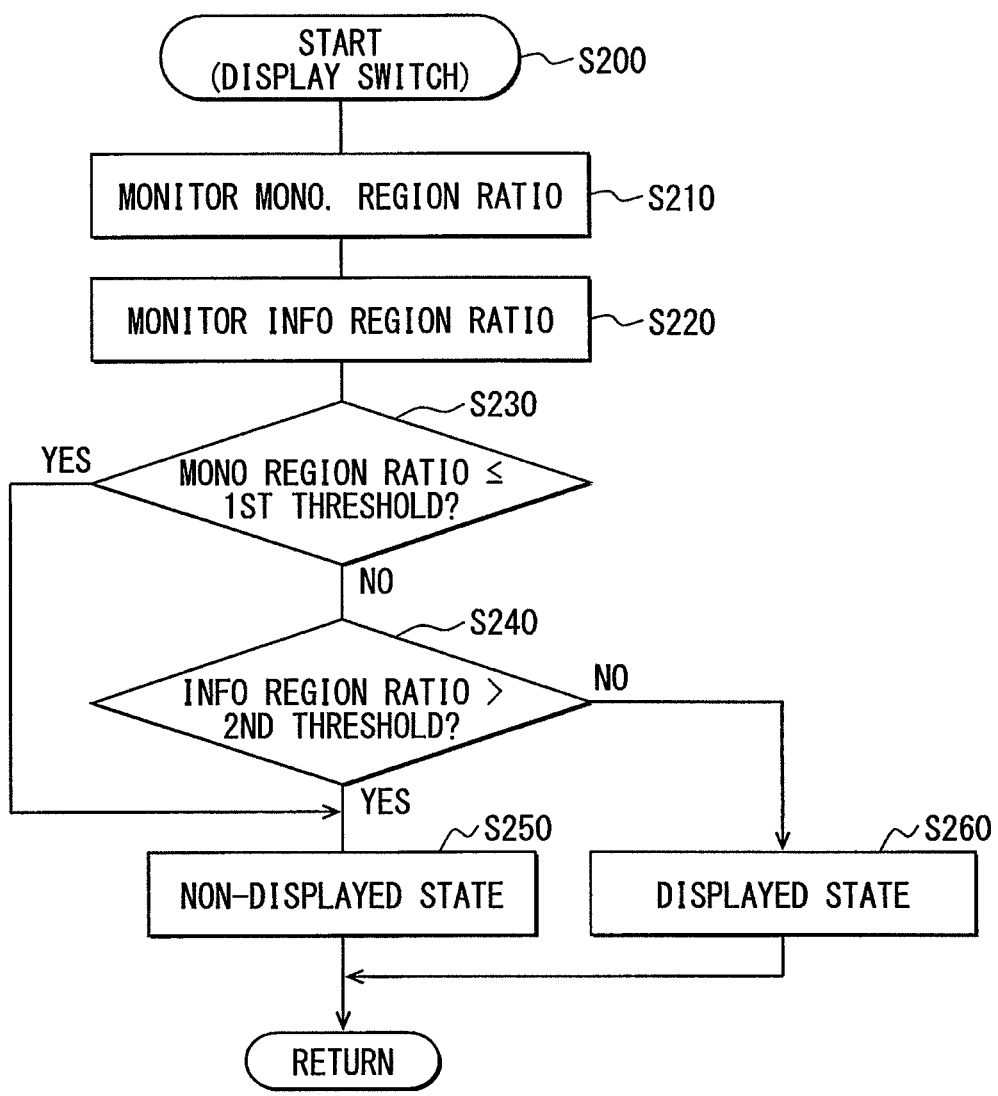
FIG. 6 is a flowchart diagram illustrating a display switching process.

The following explains a display switching process at S200 performed by the in-vehicle display apparatus 1 with reference to FIG. 6.

With the start of the display switching process, at S210, based on the recognition result of the various regions by the region recognition circuit 9, the image output circuit 3 calculates a monotonous region ratio that is a ratio of a monotonous plane region β2, which appears as a continuous identical color tone region, to the target region S extracted at S110 to S170. The image output circuit 3 then monitors a change of the monotonous region ratio with an elapse of time. The monotonous plane region β2 is already explained at S130.

At S220, the image output circuit 3 calculates an information region ratio that is a ratio of a necessary information region, which highly possibly indicates a driving information object or driving information needed to drive the vehicle 2, to the target region S extracted at S110 to S170. The image output circuit 3 then monitors a change of the information region ratio with an elapse of time. The image output circuit 3 then monitors a change of the information region ratio with an elapse of time. The necessary information region is already explained at S140.

At S230, the image output circuit 3 determines whether the monotonous region ratio calculated at S210 is equal to or less than a first threshold ratio predetermined as an index indicating a complexity of scenery. When the monotonous region ratio is equal to or less than the first threshold ratio (i.e., the complexity of the scenery is greater than a predetermined level), the processing proceeds to S250. In contrast, when the monotonous region ratio is greater than the first threshold ratio (i.e., the complexity of the scenery is not greater than the predetermined level), the processing proceeds to S240.

At S240, the image output circuit 3 determines whether the information region ratio calculated at S220 is greater than a second threshold ratio predetermined as an index indicating a largeness of information in scenery. When the information region ratio is greater than the second threshold ratio (i.e., the largeness of information in the scenery is greater than a predetermined level), the processing proceeds to S250. In contrast, when the information region ratio is not greater than the second threshold ratio (i.e., the largeness of information in the scenery is not greater than the predetermined level), the processing proceeds to S260.

At S250, the image output circuit 3 switches the driving information picture 25 into the non-displayed state in the target region S since the complexity of the scenery (or the largeness of information in the scenery) is greater than the predetermined level. When the driving information picture 25 is switched into the non-displayed state, another measure may be made. For instance, a message is displayed in the target region S so as to urge the driver to see a meter display on the vehicle 2; the driving information picture 25 is displayed on this meter display.

In contrast, at S260, the image output circuit 3 maintains the driving information picture 25 in the displayed state in the target region S or switches the driving information picture 25 from the non-displayed state into the displayed state in the target region S since the complexity of the scenery (or the largeness of information in the scenery) is not greater than the predetermined level. It is noted that either S230 or S240 may be omitted; further, either S210 or S220 may be omitted, accordingly.

<First Display Candidate Region Extraction Process>

The following explains a first display candidate extraction process (S110) performed by the in-vehicle display apparatus 1 with reference to FIGS. 7 and 8.

With the start of the present process, at S310, the region recognition circuit 9 acquires a forward scenery video (3D picture) from the camera 7. At S320, the region recognition circuit 9 converts the 3D picture acquired at S310 into a driver-viewpoint picture (hereinafter "3D target picture") that is a picture seen from the driver's viewpoint 19. This image conversion or transformation may be performed by using a well-known viewpoint conversion technology that performs "advancing side by side" (parallel translation); "rigid body conversion" (rotation and parallel translation); "similar conversion" (rotation, parallel translation, and scale change); and/or "affine transformation" (similar transformation with distortion added aslant). It is noted that the image transformation adjusts the size of the 3D target picture to match with the displayable region 20 for displaying a virtual image 21 via the liquid crystal panel 5.

Figure 8A:
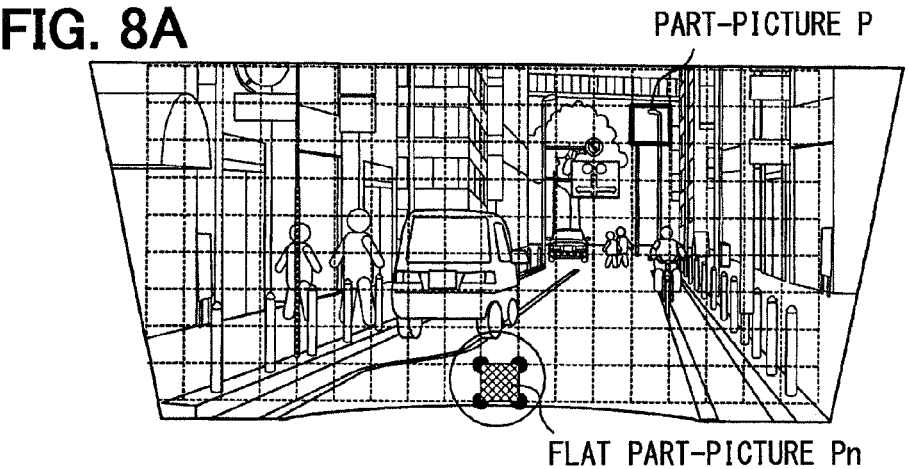
FIGS. 8A, 8B, and 8C are diagrams illustrating an extraction procedure to extract a target plane region, a monotonous plane region, and a secured plane region.
Figure 8B:
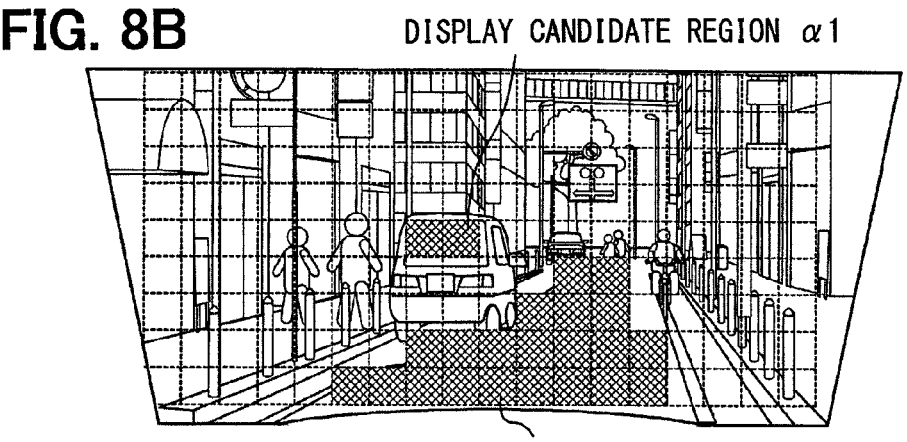
Figure 8C:
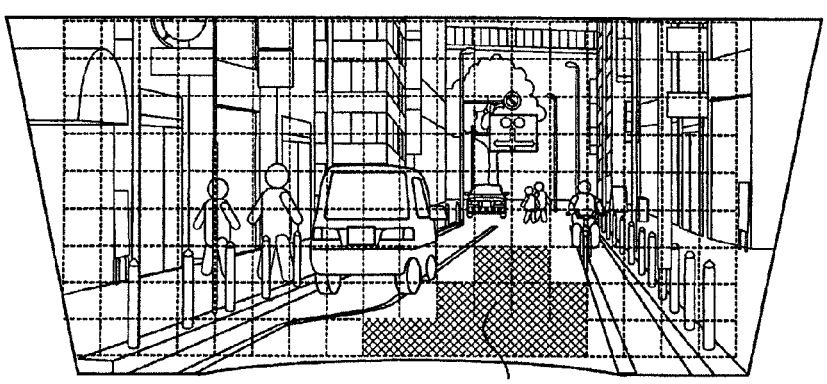

At S330, the region recognition circuit 9 divides the 3D target picture generated at S320 into W part-pictures P (refer to FIG. 8A); W is a predetermined natural number. At S340, the region recognition circuit 9 calculates three-dimensional coordinate informational data on N points within each part-picture P obtained at S330, and performs plane approximation to approximate a surface form from the three-dimensional coordinate informational data on N points to obtain a flatness degree (t) of a substance in each part-picture P. It is noted that a flatness (evenness) degree is one of the way to describe flatness of a surface form, and is a multiplicative inverse of a non-flatness degree; the non-flatness degree is a value of a deviation from a geometrically flatness (i.e., a right plane). When a subject surface form is sandwiched between two right planes, a minimum gap between the two planes is defined as being corresponding to a non-flatness degree. For instance, when the subject surface form corresponds to exactly a right plane (dead flat or really even), the minimum gap is zero while the non-flatness degree is zero and thus the flatness degree is infinite. This calculation is realized by a well-known technique, which divides a subject surface to find N intersecting points and acquires height differences between N intersecting points using a displacement measurement or angle measurement.

At S350, the region recognition circuit 9 determines whether each of the part-pictures P has a flatness degree equal to or greater than a predetermined threshold flatness degree T that is a lower limit acceptable as a flat surface. Thereby, the part-pictures P are classified into two groups: a first affirmative group includes part-pictures P each having a flatness degree (t) equal to or greater than the threshold flatness degree T; and a second negative group includes the part-pictures P each not having a flatness degree (t) equal to or greater than the threshold flatness degree T. The processing then proceeds to S360.

At S360, the region recognition circuit 9 extracts, as candidate part-pictures Pn (see FIG. 8A), the part-pictures P each having a flatness degree (t) equal to or greater than the threshold flatness degree T included in the first affirmative group classified at S350. The candidate part-picture Pn may be also referred to as a flat part-picture Pn.

At S370, the region recognition circuit 9 determines whether each of the candidate part-pictures Pn is immediately adjacent to a different candidate part-picture Pn in right-left direction or up-down direction. Thereby, the region recognition circuit 9 classifies the candidate part-pictures Pn into two groups: a first adjacent group includes the candidate part-pictures Pn being immediately adjacent to a different candidate part-picture Pn; and a second unadjacent group includes the candidate part-pictures Pn being not immediately adjacent to a different candidate part-picture Pn. The processing then proceeds to S380.

At S380, the region recognition circuit 9 extracts, as a single candidate part-pictures set, a group of the candidate part-pictures Pn consecutively adjacent to each other in right-left direction and/or up-down direction included in the first adjacent group classified at S370. The candidate part-pictures set may be also referred to as a flat part-pictures set.

At S390, the region recognition circuit 9 calculates three-dimensional coordinate informational data on N points within each candidate part-pictures set extracted at S390, and performs plane approximation to approximate a surface from the three-dimensional coordinate informational data on N points to obtain a flatness degree (t) of a substance in each candidate part-pictures set. This calculation is realized by a technology or processing similar to that at S340.

At S400, the region recognition circuit 9 determines whether each candidate part-pictures set has a flatness degree equal to or greater than the predetermined threshold flatness degree T. Thereby, the candidate part-pictures sets are classified into two groups: a first affirmative group includes the candidate part-pictures sets each having a flatness degree (t) equal to or greater than the threshold flatness degree T; and a second negative group includes the candidate part-pictures sets each not having a flatness degree (t) equal to or greater than the threshold flatness degree T. The first affirmative group will be processed at S420; the second negative group will be processed at S410.

At S420, the region recognition circuit 9 defines, as a display candidate region a1 (see FIG. 8B), each candidate part-pictures set included in the first affirmative group classified at S400.

In contrast, at S410, the region recognition circuit 9 defines, also as a display candidate region α1, each candidate part-pictures set included in the second negative group classified at S400, and further defines, also as a display candidate region α1, each candidate part-picture Pn included in the second unadjacent group classified at S370.

<Second Display Candidate Region Extraction Process>

Figure 9:
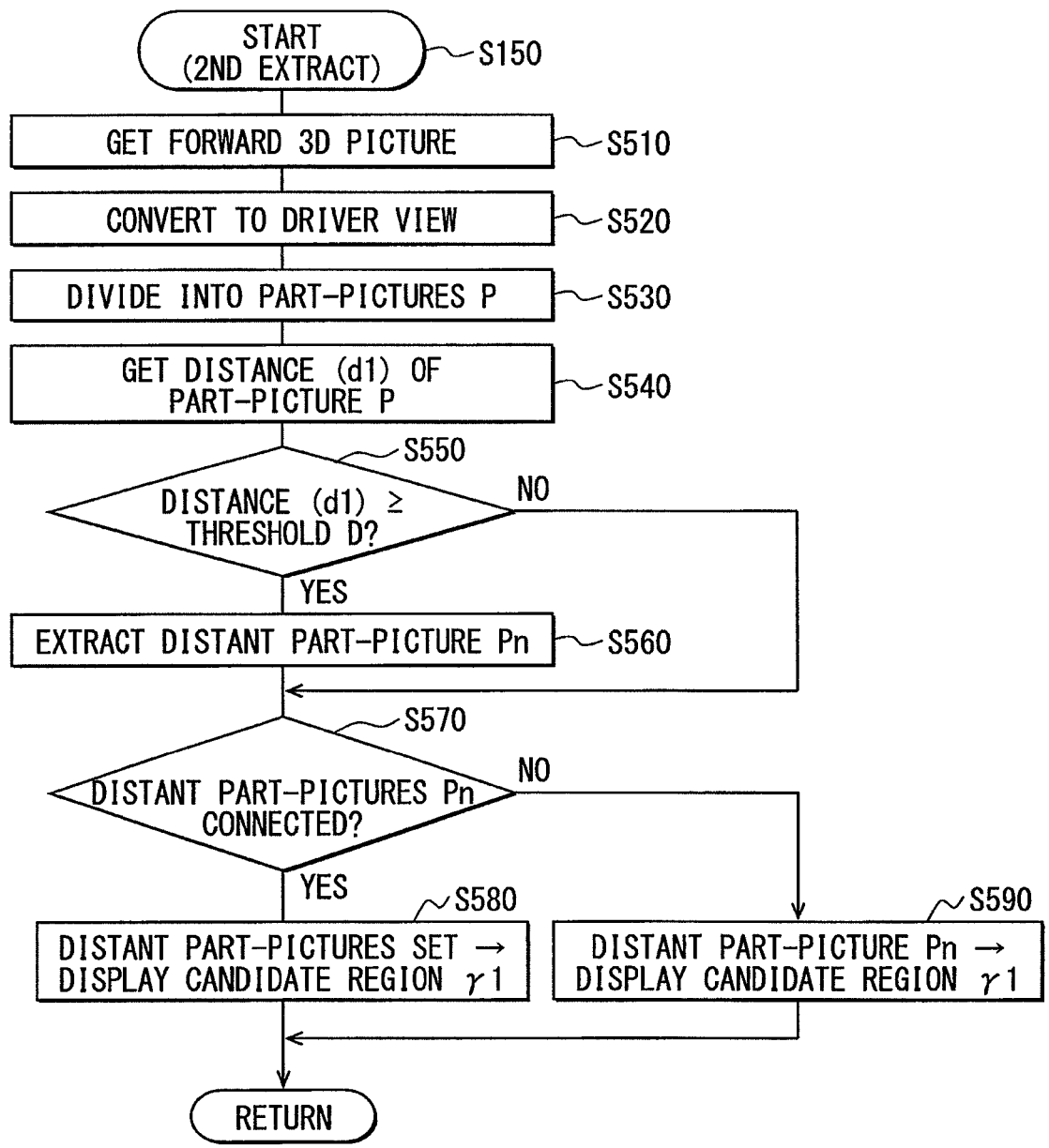
FIG. 9 is a flowchart diagram illustrating a second display candidate region extraction process.

The following explains a second display candidate extraction process (S150) performed by the in-vehicle display apparatus 1 with reference to FIGS. 9 and 10.

With the start of the present process, at S510 in FIG. 9, the region recognition circuit 9 acquires a forward scenery video (3D picture) from the camera 7. At S520, the region recognition circuit 9 converts the 3D picture acquired at S510 into a driver-viewpoint picture (hereinafter "3D target picture") that is a picture seen from the driver's viewpoint 19. This image conversion is equivalent to S320 already explained.

Figure 10A:
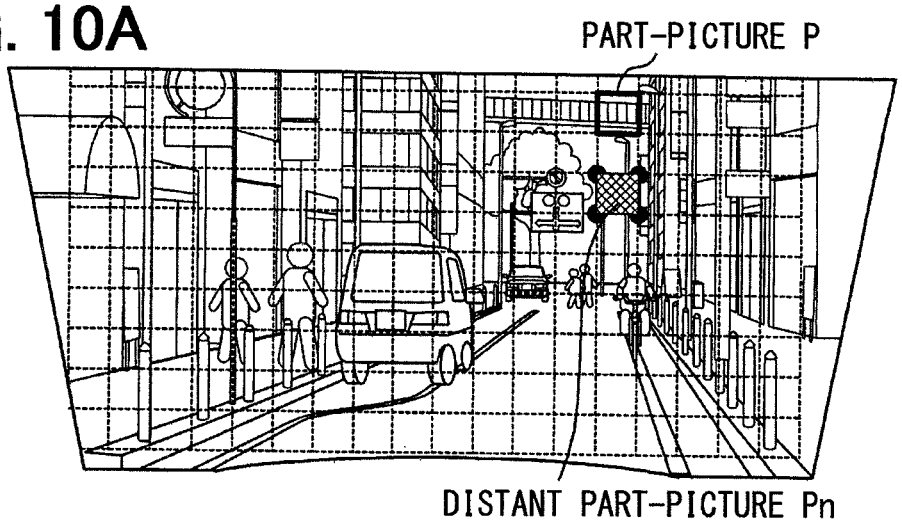
FIGS. 10A, 10B, and 10C are diagrams illustrating an extraction procedure to extract a target space region and a secured space region.
Figure 10B:
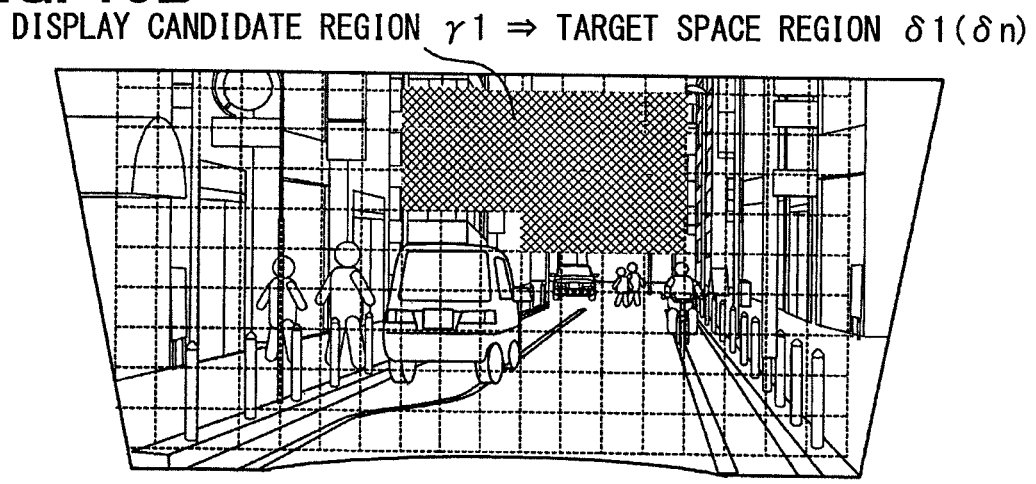
Figure 10C:
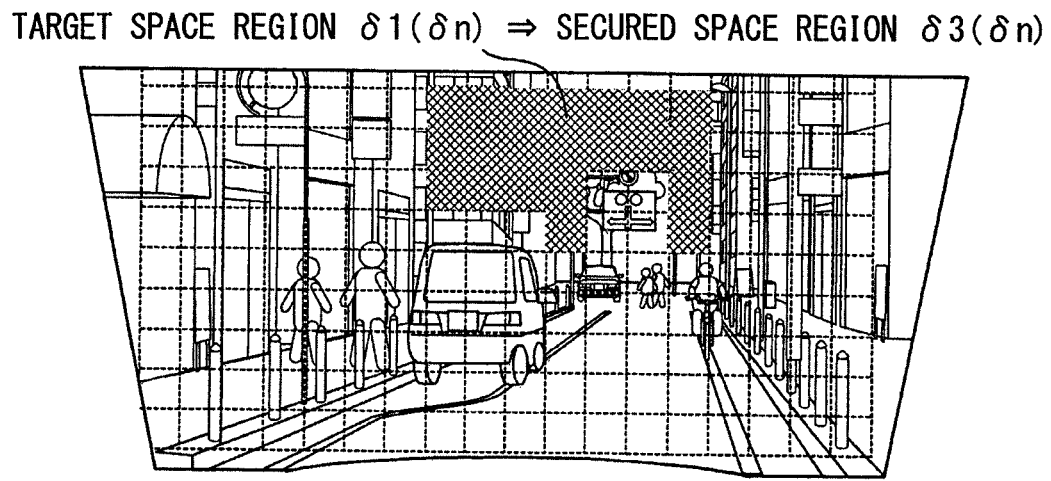

At S530, the region recognition circuit 9 divides the 3D target picture generated at S520 into W part-pictures P (refer to FIG. 10A); W is a predetermined natural number. At S540, the region recognition circuit 9 calculates three-dimensional coordinate informational data on several points within each part-picture P obtained at S530, and calculates a distance (d1) from the vehicle 2 (i.e., from the driver) based on the three-dimensional coordinate informational data on the several points.

At S550, the region recognition circuit 9 determines whether each part-picture P has a distance (d1) equal to or greater than a predetermined threshold distance D that is an lower limit acceptable as a sufficient long distance by determining whether all the several points of each part-picture P have the distance (d1) equal to or greater than the predetermined threshold distance D. Thereby, the part-pictures P are classified into two groups: a first affirmative group includes part-pictures P each having a distance (d1) equal to or greater than the threshold distance D; and a second negative group includes the part-picture P not having a distance (d1) equal to or greater than the threshold distance D. The processing then proceeds to S560.

At S560, the region recognition circuit 9 extracts, as candidate part-pictures Pn (see FIG. 10A) included in the first affirmative group classified at S550. The candidate part-picture Pn may be also referred to as a distant part-picture Pn.

At S570, the region recognition circuit 9 determines whether each of the candidate part-pictures Pn is immediately adjacent to a different candidate part-picture Pn in right-left direction or up-down direction. Thereby, the region recognition circuit 9 classifies the candidate part-pictures Pn into two groups: a first adjacent group includes the candidate part-pictures Pn being adjacent to a different candidate part-picture Pn; and a second unadjacent group includes the candidate part-pictures PN being not adjacent to a different candidate part-picture Pn. The processing then proceeds to S580.

At S580, the region recognition circuit 9 first defines, as a candidate part-pictures set, the candidate part-pictures Pn consecutively adjacent to each other in right-left direction or up-down direction included in the first adjacent group classified at S570. The candidate part-pictures set may be also referred to as a distant part-pictures set. Further, the region recognition circuit 9 defines the candidate part-pictures set as a candidate display region γ1 (see FIG. 10B).

In contrast, at S590, the region recognition circuit 9 defines, also as a candidate display region γ1, each candidate part-picture Pn included in the second unadjacent group classified at S570.

<Advantageous Effect>

As explained above, the in-vehicle display apparatus 1 is provided as follows. The region recognition circuit 9 recognizes a target plane region β1 in scenery ahead of the vehicle; the target plane region β1 corresponds to a continuous region having (i) a flatness degree equal to or greater than a predetermined threshold flatness degree and (ii) an area size equal to or greater than a predetermined threshold area size. The image output circuit 3 performs a virtual image display using the liquid crystal panel 5 to display a driving information picture 25 as a virtual image 21 such that a driver of the vehicle 2 views the virtual image 21 in the target plane region β1 within the displayable region 20 through the windshield 17 of the vehicle 2.

Under such a configuration, the driver can see the driving information picture 25 as a virtual image 21 in a relatively wide or large region (target plane region β1) having a high flatness degree (or having a low non-flatness degree) within a forward scenery ahead of the vehicle 2. This can prevent the driving information picture 25 from being overlapped with an uneven region or object having a low flatness degree (or having a high non-flatness degree) such as another vehicle, a pedestrian, or a traffic signal including a light portion.

In addition, the threshold area size defining a target plane region β1 may be designated to be much larger, so as to prevent the driving information picture 25 from appearing in proximity to the uneven region or object. For instance, even when a pedestrian moves suddenly, the pedestrian may be prevented from overlapping with the driving information picture 25 promptly.

Therefore, the in-vehicle display apparatus 1 can reduce a possibility that causes a driver not to promptly recognize the state of a traffic signal or a possibility that decreases the visibility of a displayed picture. The driver of the vehicle 2 can be provided with a proper virtual image display that displays a picture useful for driving.

In the above configuration, the in-vehicle display apparatus 1 may cooperate with a camera 7 in the vehicle 2. The camera 7 may provide a forward picture that indicates the scenery ahead of the vehicle 2 along with three-dimensional information (i.e., three-dimensional coordinate informational data). The region recognition circuit 9 may convert the forward picture into a three-dimensional driver-viewpoint picture, divide the three-dimensional driver-viewpoint picture into a plurality of part-pictures P, extract flat part-pictures Pn each of which has a flatness degree equal to or greater than the predetermined threshold flatness degree from the plurality of part-pictures P based on the three-dimensional information, connect the flat part-pictures Pn which are continuously adjoining to provide a flat part-pictures set having a flatness degree equal to or greater than the predetermined threshold flatness degree, and designate, as the target plane region β1, the flat part-pictures set having an area size greater than the predetermined threshold area size.

Yet further, in the above configuration, the region recognition circuit 9 may calculate the flatness degree as a multiplicative inverse of a gap that is formed by two right planes that sandwich a plurality of points in a surface form of each part-picture P or each flat part-pictures set based on the three-dimensional information.

In addition, the in-vehicle display apparatus 1 may be further provided as follows. The region recognition circuit 9 may recognize a monotonous plane region β2 within the target plane region β1; the monotonous plane region β2 is a continuous region having an identical color tone. The image output circuit 3 may perform a virtual image display to display a driving information picture 25 as a virtual image 21 such that a driver of the vehicle 2 views the virtual image 21 within the monotonous plane region β2.

Therefore, even when a road surface 41 ahead of the vehicle 2 is recognized as a target plane region β1, the driving information picture 25 can be prevented from being overlapped with an on-road traffic sign or on-road line. In addition, even when a road sign or road information board ahead of the vehicle 2 is recognized as a target plane region β1, the driving information picture 25 can be prevented from being overlapped with a plate board containing information necessary for driving. This helps prevent the information necessary for driving from being hidden by the picture display or from being difficult to be recognized by the driver.

Yet further, the in-vehicle display apparatus 1 may be further provided as follows. The region recognition circuit 9 may recognize a secured plane region β3 within the target plane region β1; the secured plane region β3 may preclude a necessary information region that provides information needed to drive the vehicle 2. The image output circuit 3 may perform a virtual image display to display a driving information picture 25 as a virtual image 21 such that a driver of the vehicle 2 views the virtual image 21 within the secured plane region β3.

Under this configuration, even when a target plane region β1 contains several color tones from the viewpoint 19 of the driver, the driving information picture 25 may be superimposed on a secured plane region β3 that precludes a necessary information region. This can increase an opportunity of displaying pictures safely and efficiently. In addition, the in-vehicle display apparatus 1 is further provided as follows.

The region recognition circuit 9 recognizes a target space region β1 in scenery ahead of the vehicle 2; the target space region β1 corresponds to a continuous region having (i) a distance greater than a predetermined threshold distance from the vehicle 2 and (ii) an area size equal to or greater than a predetermined threshold area size. The image output circuit 3 performs a virtual image display using the liquid crystal panel 5 to display a driving information picture 25 as a virtual image 21 such that a driver of the vehicle 2 views the virtual image 21 in the target space region β1 within the displayable region 20 through the windshield 17 of the vehicle 2.

Under such a configuration, the driver can see the driving information picture 25 as a virtual image 21 in a relatively wide or large region (target space region δ1) having a long distance from the vehicle 2 within a forward scenery ahead of the vehicle 2. This can prevent the driving information picture 25 from being superimposed on an object existing in proximity to the vehicle 2; the object may include a road sign, a road information board, a different vehicle, a pedestrian, or an obstacle.

Therefore, the in-vehicle display apparatus 1 can certainly reduce a possibility that prevents a driver from promptly recognizing the information, which is necessary for driving and near the vehicle 2. The driver of the vehicle 2 can be provided with a proper virtual image display that displays a picture useful for driving.

In the above configuration, the in-vehicle display apparatus 1 may cooperate with a camera 7 in the vehicle 2. The camera 7 may provide a forward picture that indicates the scenery ahead of the vehicle 2 along with three-dimensional information. The region recognition circuit 9 may convert the forward picture into a three-dimensional driver-viewpoint picture, divide the three-dimensional driver-viewpoint picture into a plurality of part-pictures P, extract distant part-pictures Pn each of which has a distance equal to or greater than the predetermined threshold distance from the vehicle 2 from the plurality of part-pictures P based on the three-dimensional information, connect the distant part-pictures Pn which are continuously adjoining to provide a distant part-pictures set, and designate, as the target space region δ1, the distant part-pictures set having an area size greater than the predetermined threshold area size.

In addition, the in-vehicle display apparatus 1 may be further provided as follows. The region recognition circuit 9 may recognize a secured space region δ3 within the target space region δ1; the secured space region δ3 may preclude a necessary information region that provides information needed to drive the vehicle 2. The image output circuit 3 may perform a virtual image display to display a driving information picture 25 as a virtual image 21 such that a driver of the vehicle 2 views the virtual image 21 within the secured space region δ3.

Therefore, the in-vehicle display apparatus 1 can certainly reduce a possibility that prevents a driver from promptly recognizing the information, which is necessary for driving and far from the vehicle 2. The driver of the vehicle 2 can be provided with a proper virtual image display that displays a picture useful for driving.

Yet further, the in-vehicle display apparatus 1 is further provided as follows. The region recognition circuit 9 recognizes a monotonous region within a target region S; the monotonous region is a continuous region having an identical color tone. The image output circuit 3 causes a driving information picture 25 (i.e., virtual image 21) to switch into a non-displayed state when a ratio of the monotonous region to the target region S is equal to or less than a predetermined threshold ratio.

Under such a configuration, when the driver sees a traffic signal, a road sign, a road information board, etc. entering a predetermined region (i.e., target region S) that displays a virtual image 21, the ratio of a sky scenery (monotonous region) to the target region S decreases. This permits the virtual image 21 to evacuate the target region S.

Therefore, according to the in-vehicle display apparatus 1, the superimposition display or close proximity display of a driving information picture 25 can be prevented under the state where a traffic signal, a road sign, a road information board, etc. exists in a vehicle forward direction. The driver of the vehicle 2 can be provided with a proper virtual image display that displays a picture useful for driving.

In addition, the in-vehicle display apparatus 1 is further provided as follows. The region recognition circuit 9 recognizes a necessary information region within the target region S; the necessary information region is a region necessary for driving the vehicle 2. The image output circuit 3 causes a driving information picture 25 (i.e., virtual image 21) to switch into a non-displayed state when a ratio of the necessary information region to the target region S is equal to or greater than a predetermined threshold ratio.

Under such a configuration, even when a target region S contains several color tones from the viewpoint 19 of a driver, the driving information picture 25 is permitted to be superimposed on a secured region that precludes a necessary information region. This can increase an opportunity of displaying pictures safely and efficiently.

Other Embodiments

Up to this point, description has been given to an embodiment of the present disclosure. The present disclosure is not limited to the above embodiment, and it can be variously embodied as long as not departing from a scope of the present disclosure.

For instance, the in-vehicle display apparatus 1 according to the present embodiment switches the driving information picture 25 (virtual image 21) between the displayed state and the non-displayed state through the display switching process. There is no need to be limited to the above. Instead of being switched into the non-displayed state, a driving information picture 25 (virtual image 21) may be moved within a target region S so as not to be superimposed on an on-road line, an on-road sign, a road sign, a road information board, another vehicle, a pedestrian, an obstacle, etc.

For instance, the in-vehicle display apparatus 1 according to the present embodiment does not specifically describe a size of a driving information picture 25 in a picture data outputted from the image output circuit 3 to the liquid crystal panel 5. For example, a driving information picture 25 may be larger as a target region S is larger—and vice versa.

For instance, the in-vehicle display apparatus 1 according to the present embodiment changes a setup or configuration of a target region S for displaying a driving information picture 25 (virtual image 21) through the display switching process. There is no need to be limited to the above. The setup or configuration of a target region S may be first fixed to a predetermined region (e.g., sky or road surface) viewed through the windshield 17 from a driver; the displayed state and the non-displayed state of a virtual image may be then switched depending on the ratio of the monotonous region or the ratio of the necessary information region, for example.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An in-vehicle display apparatus in a vehicle, comprising:
   a virtual image display device that permits a windshield or a combiner to reflect a predetermined light towards an eye of a driver of the vehicle to display a picture, the virtual image display device displaying the picture in a displayable region as a virtual image appearing ahead of the vehicle;
   a region recognition circuit that recognizes a target plane region in scenery ahead of the vehicle, the target plane region being a continuous region having (i) a flatness equal to or greater than a predetermined threshold flatness and (ii) an area size equal to or greater than a predetermined threshold area size; and
   an image output circuit that causes the virtual image display device to display the virtual image in the displayable region such that a driver of the vehicle views the virtual image in the target plane region recognized by the region recognition circuit,
   wherein the in-vehicle display apparatus cooperates with a camera in the vehicle, the camera providing a forward picture that indicates the scenery ahead of the vehicle along with three-dimensional information;
   wherein the region recognition circuit
      converts the forward picture into a three-dimensional driver-viewpoint picture,
      divides the three-dimensional driver-viewpoint picture into a plurality of part-pictures,
      extracts flat part-pictures each of which has a flatness equal to or greater than the predetermined threshold flatness from the plurality of part-pictures based on the three-dimensional information,
      connects the flat part-pictures that are continuously adjoining to provide a flat part-pictures set that has a flatness equal to or greater than the predetermined threshold flatness, and designates, as the target plane region, the flat part-pictures set having an area size greater than the predetermined threshold area size; and wherein the region recognition circuit calculates the flatness as a flatness degree, which is a multiplicative inverse of a gap that is formed by two right planes that sandwich a plurality of points in a surface form of each part-picture or each flat part-pictures set based on the three-dimensional information.

2. The in-vehicle display apparatus according to claim 1, wherein:

the region recognition circuit recognizes a secured plane region within the target plane region, the secured plane region precluding a necessary information region that provides information needed to drive the vehicle; and the image output circuit causes the virtual image display device to display the virtual image such that the driver views the virtual image in the secured plane region recognized by the region recognition circuit.

3. A non-transitory, computer-readable medium having instructions stored thereon, which when executed by one or more computers in a vehicle, a virtual image display device in the vehicle permitting a windshield or a combiner to reflect a predetermined light towards an eye of a driver of the vehicle to display a picture, the virtual image display device displaying the picture in a displayable region as a virtual image appearing ahead of the vehicle, and a camera in the vehicle providing a forward picture that indicates the scenery ahead of the vehicle along with three-dimensional information, results in the following functions being performed by the one or more computers:

recognizing a target plane region in the scenery ahead of the vehicle, the target plane region being a continuous region having (i) a flatness equal to or greater than a predetermined threshold flatness and (ii) an area size equal to or greater than a predetermined threshold area size;

causing the virtual image display device to display the virtual image in the displayable region such that a driver of the vehicle views the virtual image in the target plane region recognized by the region recognition circuit;

converting the forward picture into a three-dimensional driver-viewpoint picture;

dividing the three-dimensional driver-viewpoint picture into a plurality of part-pictures;

extracting flat part-pictures each of which has a flatness equal to or greater than the predetermined threshold flatness from the plurality of part-pictures based on the three-dimensional information, connecting the flat part-pictures that are continuously adjoining to provide a flat part-pictures set that has a flatness equal to or greater than the predetermined threshold flatness, and designating, as the target plane region, the flat part-pictures set having an area size greater than the predetermined threshold area size; and calculating the flatness as a flatness degree, which is a multiplicative inverse of a gap that is formed by two right planes that sandwich a plurality of points in a surface form of each part-picture or each flat part-pictures set based on the three-dimensional information.

4. The non-transitory, computer-readable medium according to claim 3 having further instructions stored thereon, which when executed by the one or more computers in the vehicle, results in the following further functions being performed by the one or more computers:

recognizing a secured plane region within the target plane region, the secured plane region precluding a necessary information region that provides information needed to drive the vehicle; and causing the virtual image display device to display the virtual image such that the driver views the virtual image in the secured plane region recognized by the region recognition circuit.

* * * * *